United States Patent Office 2,953,818
Patented Sept. 27, 1960

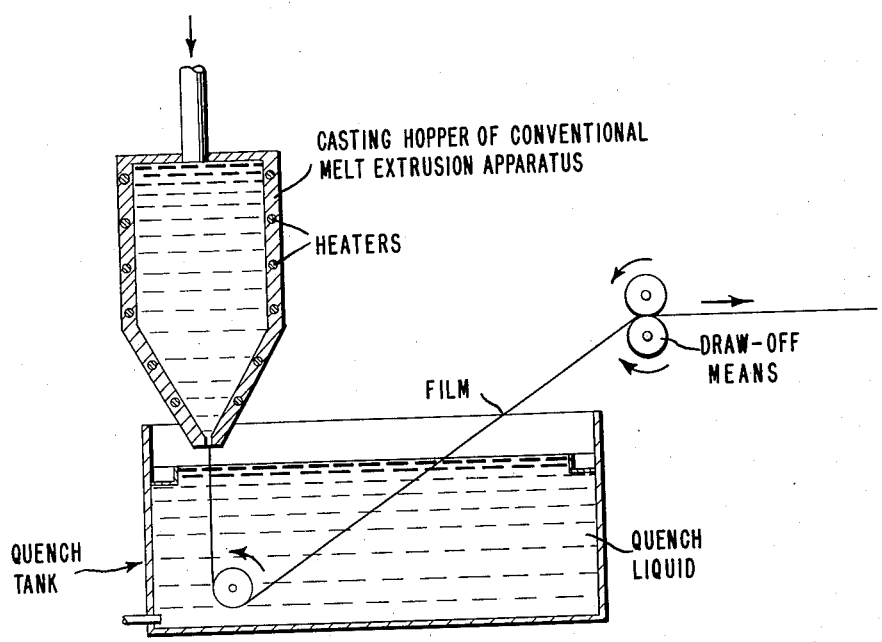

2,953,818

PROCESS FOR PRODUCING POLYVINYL FLUORIDE FILM FROM MIXTURE OF POLYVINYL FLUORIDE PARTICLES AND LATENT SOLVENT THEREFOR

Lester Ray Bartron, Wilmington, Del., assignor to E. I. du Pont de Nemours and Company, Wilmington, Del., a corporation of Delaware Filed Feb. 14, 1958, Ser. No. 715,394

13 Claims. (Cl. 18—57)

This invention relates to a process for forming shaped structures of polyvinyl fluoride and more particularly to an extrusion process for the preparation of films from orientable polyvinyl fluoride.

The preparation of orientable polyvinyl fluoride is described in U.S. Patents Numbers 2,419,008, 2,419,010, 2,510,783, and 2,599,300. The polymers prepared according to these procedures have attractive properties and in film form possess an unusual combination of excellent outdoor durability, toughness, inertness, transparency and retention of properties at both low and elevated temperatures. Although films of polyvinyl fluoride have been described, no entirely satisfactory film-forming technique has heretofore been devised. With polyvinyl fluorides high enough in molecular weight that films produced therefrom have useful property levels, melt viscosities, even at temperatures well above the crystalline melting temperature of the particular polymer, are too high to permit the production of film therefrom by conventional melt extrusion techniques. Attempts to increase the fluidity of the melt by raising its temperature lead to thermal decomposition of the polymer which occurs in the absence of air at temperatures above approximately 220° C., evidenced chiefly by a brownish discoloration of the film. As a matter of fact, even with radically modified, massive, heavy duty equipment, it has not been possible to melt extrude films of these higher molecular weight polyvinyl fluorides by conventional melt extrusion techniques.

The casting of the films by flowing solutions of the polymer onto suitable surfaces and subsequently removing the solvent from the film would seem to offer a means of avoiding the problems of thermal instability and high melt viscosity associated with melt extrusion. Unfortunately, however, polyvinyl fluoride is insoluble in commonly used volatile solvents such as acetone, petroleum ether, isooctane, xylene, carbon tetrachloride, chloroform, methanol, ethanol, etc., and polyvinyl fluorides of high inherent viscosity (high molecular weight), which are preferred for film manufacture, are less soluble even in hot solvents such as hot dimethylformamide, tetramethylene sulfone, nitroparaffins, cyclohexanone, dibutyl ketone, mesityl oxide, aniline, phenol, methyl benzoate, phenyl acetate and diethyl phosphate than are the polyvinyl fluorides of lower inherent viscosity. While the use of hot solutions to accomplish solvent casting techniques has met with some success, it does present serious problems from the standpoint of equipment and safety requirements.

Further, all orientable polyvinyl fluorides do not enjoy even the same degree of limited solubility indicated above. For example, those orientable polyvinyl fluorides produced according to procedures described in U.S. Patents Numbers 2,510,783 and 2,599,300, even in the relatively low molecular weight ranges, are not completely soluble even in hot solvents. As polymer molecular weight increases into the more useful range, this degree of intractability increases markedly to the point where undissolved polymer gel may exist even at the boiling point of the solvent. The presence of gel structures precludes the manufacture of homogeneous polyvinyl fluoride film by solution casting of the higher molecular weight polymer.

Furthermore, film formation by conventional solution casting techniques is normally characterized by relatively low throughput efficiency; for example, film yields from a pound of solution commonly range between 0.1 and 0.25 pound. Equipment considerations in casting of films from relatively dilute solutions severely limit the maximum thickness of film which may be produced economically. Since Coffman et al. have demonstrated that the physical properties of orientable polyvinyl fluoride may be enhanced by elongating films made therefrom, it is logical to presume that attempts will be made to orient the polyvinyl fluoride film as produced by the process of this invention. The maximum thickness of polyvinyl fluoride film which can be produced places a distinct limitation on the extent to which it can be elongated in mutually perpendicular directions for the purpose of achieving molecular orientation. For example, if it was found desirable to produce a one-mil thick sheet of polyvinyl fluoride film which had been stretched 3× by 3× from its original dimensions, then it would have been necessary to start with a film at least 9 mils thick. The equipment requirements necessary to produce a 9 mil thick film from a hot solution containing in the range of 10–20% polymer by weight are economically prohibitive.

An object of this invention, therefore, is to provide a simple and economical extrusion process for forming stretchable, self-supporting films of orientable polyvinyl fluoride. Another objective is to provide a continuous extrusion process for forming self-supporting films from orientable polyvinyl fluorides having high inherent viscosities (high molecular weights), said process being characterized by relatively high throughput efficiency and the absence of thermal degradation of the extruded polymer. The foregoing and related objects will more clearly appear hereinafter.

These objects are realized by the present invention which briefly stated comprises (1) heating a mixture comprising essentially from 85% to 10% by weight, based on the total weight of the mixture, of particles of an orientable polyvinyl fluoride having an inherent viscosity of at least 1, and from 15% to 90% by weight of a latent solvent for polyvinyl fluoride, to an elevated temperature effective to completely coalesce said particles and convert said mixture into a fluid, single phase composition; (2) extruding said fluid composition to form a self-supporting shaped structure, e.g., a film, at an elevated temperature below the boiling point of the latent solvent; and (3) immediately thereafter cooling said shaped structure to a temperature below 100° C.

The term "latent solvent" as used herein is defined as an organic liquid having a boiling point above 100° C. (at atmospheric pressure), and having no significant solvent or swelling action on polyvinyl fluoride at room temperature, but being capable, at an elevated temperature below its normal boiling point of solvent action sufficient to cause polyvinyl fluoride particles to coalesce.

As indicated hereinabove, in order to produce shaped structures of polyvinyl fluoride having useful property levels, it is necessary to use a polymer having an inherent viscosity of at least 1, and in the production of film the polymer should have an inherent viscosity of at least 1.5 and preferably in the range of 3.5–4.0. Polymer in this preferred range gives an optimum balance between throughput rate of finished, solvent-free film and property level of the film and is extrudable in accordance with this invention, and with available extrusion equipment, at temperatures low enough to avoid thermal degradation.

In addition to the homopolymers of vinyl fluoride there may be employed copolymers of vinyl fluoride with other monoethylenically unsaturated monomers copolymerizable therewith, wherein the vinyl fluoride is present in substantial or in major amount, i.e., at least 75% to 80% of the total by weight. Examples are mono-ethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochloroethylne, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, nitriles, amides, anhydrides and acid halides, including methyl methacrylate, beta-hydroxyethyl methacrylate, allyl methacrylate, acrylonitrile, N-butyl methacrylamide, etc.; derivatives of maleic and fumaric acids, e.g., diethylmaleate and dimethylfumarate; propenyl esters; e.g., allyl acetate, isopropenyl acetate, etc. The presence in these copolymers of even a small percentage of a comonomer which, as a homopolymer, is normally more soluble in the selected latent solvent than is the homopolymer of vinyl fluoride, may render said copolymer sufficiently more soluble in aforementioned latent solvent as to permit its extrusion from feed mixtures containing considerably less solvent than is needed in the extrusion of homopolymers of vinyl fluoride.

The process of this invention is applicable to the extrusion of homopolymers other than that of vinyl fluoride. For example, shaped structures of polyvinylidene fluoride may be successfully extruded according to the process of this invention. Although the higher thermal stability and lower melt viscosity of polyvinylidene fluoride at melt temperatures does permit the successful extrusion of this polymer into useful shaped articles, e.g. films, etc. without the use of a latent solvent, a gel film of polyvinylidene fluoride containing a latent solvent therefor may, like its polyvinyl fluoride counterpart, be successfully biaxially oriented in mutually perpendicular directions with resultant upgrading in property levels.

The compounds disclosed hereinafter as latent solvents for polyvinyl fluoride are also latent solvents for polyvinylidene fluoride.

To avoid or minimize the possibility of thermally degrading the polymer, the preferred extrusion temperature is the lowest one that is operable at a solvent concentration which permits a satisfactory throughput rate of finished film of satisfactory quality. In general, the extrusion temperature may range from 120° C. to 220° C. As solvent concentration increases, the minimum extrusion temperature decreases. Conversely, as extrusion temperature is increased, the solvent concentration necessary to permit extrusion decreases.

With any given polymer and piece of extrusion equipment, the extrusion temperature and solvent concentration are completely interdependent variables. For example, when gamma-butyrolactone is employed as the latent solvent and polyvinyl fluoride having an inherent viscosity of from 3.5–4 is employed as the polymer, the preferred extrusion temperature ranges from about 135° C. to 175° C. Other polymers, solvents and/or concentrations thereof may either broaden or narrow this range and/or shift it in either direction. The lower the extrusion temperature, the less solvent will be lost in the air gap between the hopper lips and the point at which the issuing extrudate is first subjected to cooling.

In all instances, the preferred extrusion temperature is subject to the upper limitation of the normal boiling point of the latent solvent. The temperature in the extruder may exceed the normal boiling point of the latent solvent provided the extrudate actually issues from the hopper lips at a temperature below the normal boiling point of the latent solvent. Extrusions at temperatures at or above the normal boiling point of the latent solvent result in bubbled film because of "flashing" of the solvent on the sudden reduction in pressure occurring as the extrudate issues from the hopper lips.

Although the boiling point of latent solvents useful for purposes of this invention may be as low as 100° C., in order to realize satisfactory throughput rates in the extrusion of film the temperature of extrusion is preferably not less than 120° C., hence the more useful latent solvents will be those having boiling points above 120° C.

The latent solvent need not necessarily be a liquid at room temperature provided its melting point is not so high that the temperature necessary for liquid blending of latent solvent and polymer subjects the polymer to thermal degradation. It should be thermally stable up to its normal boiling point, or at least up to the temperature necessary to cause coalescence of polymer particles. It should not react chemically with either the polymer or the materials of construction of the process equipment over the expected temperature range, and if cooling of the extruded structure is effected in a quench bath the latent solvent should not be chemically reactive with the quench bath liquid.

In addition to the aforementioned gamma-butyrolactone, the following are examples of specific compounds representative of the class of latent solvents useful in the process of the present invention:

Butadiene cyclic sulfone, tetramethylenesulfone, dimethylsulfolane, hexamethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N-dimethylformamide, N,N-dimethyl-gamma-hydroxyacetamide, N,N - dimethyl-gamma-hydroxybutyramide, N,N - dimethyllactamide, N,N - dimethylmethoxyacetamide, N-methylacetamide, N-methylformamide, N,N-dimethylaniline, N,N-dimethylethanolamine, 2-piperidone, N-methyl-2-piperidone, N-methyl-2-pyrrolidone, N-ethyl-2-pyrrolidone, N - isopropyl-2-pyrrolidone, 5-methyl-2-pyrrolidone, beta-propiolactone, delta-valerolactone, gamma-valerolactone, alpha-angelicalactone, beta-angelicalactone, epsilon-caprolactone, and alpha, beta and gamma-substituted alkyl derivatives of gamma-butyrolactone, gamma-valerolactone and delta-valerolactone, as well as delta-substituted alkyl derivatives of delta-valerolactone, tetramethyl urea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis-(methoxymethyl)uron, methylacetylsalicylate, diethyl phosphate, dimethyl phthalate, ethyl acetoacetate, methyl benzoate, methylene diacetate, methyl salicylate, phenyl acetate, triethyl phosphate, tris(morpholino) phosphine oxide, N-acetylmorpholine, N-acetylpiperidine, isoquinoline, quinoline, pyridine and tris(dimethylamido) phosphate.

An extrudable composition may be formed containing as little as 15% latent solvent by weight. Depending somewhat on the polymer itself, particles thereof tend to settle out in the range of about 10% by weight of solids. The preferred solvent concentration range is from 40% to 60%. The lower the solvent content of the issuing extrudate, the less solvent will be lost in the air gap between the point of extrusion and the point where the extruded structure is first subjected to rapid cooling.

The preferred expedient for effecting rapid cooling of the freshly extruded structure is a liquid quench bath and, because of its cheapness, high specific heat and high thermal conductivity at quench bath temperature ranges, the preferred quench liquid is water. In general, any liquid system which will not react chemically with polyvinyl fluoride at the quench bath temperature, and which has a boiling point sufficiently high so that it will not boil off as the freshly extruded structure enters the bath will serve as the quench liquid. Surface boiling of the quench liquid causes poor film appearance. Such liquid systems include sodium chloride and calcium chloride brines, latent solvents and mixtures of latent solvents and water. The use of latent solvents as quench liquids is advantageous in that it eliminates the necessity for separation and recovery of latent solvent from the quench bath. The quench bath should be maintained at a temperature sufficiently low to effect rapid cooling of the freshly extruded structure to a temperature below 100° C. Since clarity and surface smoothness of film seem to improve as the quench bath temperature is decreased, it should be as low as practicable, e.g., a quench bath of water should be maintained at a temperature just above 0° C.

The continuously issuing extrudate may also be quenched by allowing it to pass between two driven chilled polished stainless steel belts, spaced apart one from the other a distance calculated to place the extrudate under slight compression to insure intimate contact between the extrudate and the surfaces of the belts. The belts may be chilled by immersing either the entire assembly or a portion thereof into a cooled bath comprising water and/or a latent solvent, or by spraying the cooling liquid on either or both sides of said belts. Chilled nip rolls may likewise be used to quench the issuing extrudate. Like the belts above, they should be spaced apart such a distance and placed under a load sufficient to insure intimate surface contact between the rollers and the extrudate. Optionally, they may be entirely or partially immersed in a cooling liquid bath as indicated above, or may be cooled either by external spraying or by internal circulation of a coolant. If desired, quenching may be accomplished by extruding onto a moving, chilled, smooth metal surface, such as that of an endless belt or of a rotating drum. Any of the above alternate methods may be followed by a quench bath operating in the preferred manner.

Any convenient arrangement of conventional apparatus may be employed to carry out the process of this invention. One such arrangement for the extrusion of film is illustrated diagrammatically in the accompanying drawing. Referring to the drawing: a mixture of particulate polyvinyl fluoride and latent solvent is continuously fed to a heated extruder of conventional design and provided with a heated casting hopper with lips suitably spaced to form the extrudate passing therebetween into a film of predetermined thickness. The mixture in the extruder is heated to a temperature effective to completely coalesce the polymer particles and form a single phase fluid composition which is fed from the extruder in self-supporting film form and immediately into a quench bath. The preferred location of the quench bath is such that the surface of the liquid is between ¼" and ½" from the hopper lips. If the lips were actually immersed in the bath liquid, it would heat up and perhaps boil. If the air gap is much larger than that specified above, solvent losses from the extrudate will be higher. Ideally the hopper is so positioned that the extrudate travels vertically into the bath to avoid any wiping or smearing of the expanding extrudate over the edges of the hopper lips.

The feed to the extruder may be prepared by blending polymer with latent solvent in a wide variety of mixing equipment, including Hobart mixers, Waring Blendors, ball mills, colloid mills and sand grinding equipment such as that described in U.S. Patent No. 2,581,414, etc. It is not necessary to deaerate mixtures of polymer and latent solvent before feeding to the extruder, even though considerable air may be incorporated in these mixtures by some of the above mixing means. Any entrapped air continually and automatically bleeds out through the feed end of the extruder. The physical appearance of the feed will depend not only on the solvent concentration therein but also on the degree of wettability of polymer by solvent, which in turn depends on the specific polymer employed and the specific solvent. Feed mixtures ranging in consistency from a fluffy, damp, free-flowing powder through heavy pastes and viscous liquids to freely-flowing liquids are quite operable in the process of this invention. The powdery and more viscous feeds are handled easily by an auger with interchangeable parts. The more fluid feeds are readily metered by employing, for example, a Moyno pump equipped if necessary with extra impellers and stirrers to maintain the solids homogeneously suspended.

The feed may be comprised, in whole or in part, of finely chipped flakes of recycled polyvinyl fluoride film. Recycled film may comprise either solvent-containing or solvent-free polyvinyl fluoride film chips. Recycled material may optionally be combined with polymer not previously extruded and/or with fresh latent solvent. Plasticizers, modifiers, stabilizers, softeners, dyes, pigments, fillers, natural or synthetic resins, antioxidants, light absorbers, etc. may, if desired, be incorporated into the feed by any suitable mixing technique.

The quenched solvent-containing polyvinyl fluoride film resulting from the process of this invention may be further processed in a variety of ways.

(1) It may be "dried" to a substantially solvent-free condition, in which state it possesses useful properties.

(2) It may be oriented in two mutually perpendicular directions by a variety of techniques, followed by evolution of all or a portion of the remaining solvent contained therein.

(3) While containing solvent, it may be laminated to itself or to numerous other flexible and/or rigid materials either with or without the use of an intermediate adhesive layer, as indicated in copending application U.S. Serial No. 555,794, filed December 28, 1955, in the name of Joseph Gordon Calton. Free of solvent, it may be laminated to itself or to numerous other flexible and/or rigid materials in the conventional manner employing an intermediate adhesive layer.

(4) While substantially solvent-free it may be coated with a variety of materials designed to enhance the properties already inherent in the base sheet or to impart new and different properties to the combination. Coatings may comprise a wide variety of thermoplastic polymers, metallic coatings, size coatings, etc.

(5) Either while containing solvent or while substantially solvent-free, polyvinyl fluoride film may be ground or chipped and incorporated into the feed to the extruder employed in the process of this invention.

The following illustrative examples constitute specific embodiments of the process of this invention and are not intended to be limitative. Although these examples and the accompanying illustrative sketch are directed to the production of flat film structures by extrusion, it should be understood that the process of this invention is equally applicable to tubular extrusion, employing any or all of the techniques usual to this art.

Although the throughput rates in the following examples vary widely, it will be noted that this depends on the scale of the equipment used as well as on the nature of the feed to the extruder. In all respects and in consideration of these variables, these throughput rates are considered to be quite satisfactory.

In the following examples, percentages are by weight unless otherwise indicated. In these examples, inherent viscosity of polyvinyl fluoride was determined by the following procedure.

Inherent viscosity is measured by dissolving polyvinyl fluoride in hexamethylphosphoramide by violently agitating the mixture at an elevated temperature. The solution is cooled to 30° C. and the viscosity of this solution is measured relative to that of the solvent treated in the same manner. The time of efflux through a viscosimeter is measured for the solvent (no polymer present) and the solution of polymer in solvent. Inherent viscosity is calculated as follows:

Let $T_0$=solvent flow time in seconds $T_1$=solution flow time in seconds $$\text{Relative viscosity} = \frac{T_1}{T_0}$$

In a table of natural logarithms, the natural logarithm of the relative viscosity is determined.

$$\text{Inherent viscosity} = \frac{\text{the natural logarithm of relative viscosity}}{C}$$

where C is the concentration expressed in grams of polymer per 100 ml. of solution. In the following examples, $C=0.05$ g./100 ml.

Example 1

An 83% solids mixture of polyvinyl fluoride of inherent viscosity 2.5 and gamma-butyrolactone was prepared. This mixture had a fluffy, powdery consistency. It was fed to a heated extruder connected to a 12" wide slotted casting hopper maintained at approximately 190° C. from which it was extruded continuously at the rate of approximately 20 lbs./hr. into a water bath maintained at 10° C., producing a tough, flat sheet. Lack of any yellowish or brownish discoloration of this sheet indicated that the polymer had not been thermally degraded during the process of this extrusion. Draw-off rate was adjusted to produce a 5 mil thick film at the approximate linear rate of 12 feet/min. Substantially all of the gamma-butyrolactone was volatilized in a current of warm air while the film was restrained to prevent shrinkage.

Example 2

Using a polyvinyl fluoride with an inherent viscosity of 4.6, a 17% solids mixture and gamma-butyrolactone was prepared. This mixture had a paste-like consistency. It was extruded in the same manner as in Example 1 from a 6" wide slotted steel casting hopper maintained at 150° C. at the rate of approximately 10 lbs./hr. and quenched in a water bath maintained at about 8° C. The resulting 18 mil thick film was tough and pliable and showed no evidence of thermal degradation.

Example 3

An 83% solids mixture of polyvinyl fluoride of inherent viscosity 1.5 and N-methyl-2-pyrrolidone was prepared and fed to a heated extruder connected to a 12" wide slotted steel casting hopper maintained between 190° C.–195° C. From here it was extruded continuously into water maintained at approximately 10° C. at the rate of approximately 8 lbs./hr., producing a tough, flat sheet. There was no evidence of thermal degradation. Draw-off rate was adjusted to produce a 15 mil thick film at the approximate linear rate of 5 feet/min. Following quenching, the sheet of polyvinyl fluoride was exposed to rapidly moving warm air for about 10 minutes. This was sufficient to volatilize substantially all of the N-methyl-2-pyrrolidone.

Example 4

A 77% solids mixture of polyvinyl fluoride of inherent viscosity 1.6 and gamma-valerolactone was prepared and fed into a heated extruder connected to a 12" slotted steel casting hopper maintained at 180° C. and from there continuously extruded into a water bath maintained at about 10° C. at the rate of approximately 20 lbs./hr., producing a tough, pliable, flat sheet. There was no evidence of the discoloration characteristic of a thermally degraded polymer. Draw-off rate was adjusted to produce a 5 mil thick film at the approximate linear rate of 12 feet/min.

Example 5

A 40% solids mixture of polyvinyl fluoride of inherent viscosity 4.9 and gamma-valerolactone was prepared and fed into a heated extruder, from there to a 6" wide slotted steel casting hopper maintained at about 150° C. and from ther continuously extruded into a water bath maintained at approximately 8° C. at the rate of about 5 lbs./hr. The resulting pliable flat sheet was approximately 18 mils thick. The film exhibited neither yellowish nor brownish discoloration, which discoloration would have indicated that the polymer had been thermally degraded.

Example 6

A 45% solids mixture of polyvinyl fluoride of inherent viscosity 3.0 and gamma-valerolactone was prepared and extruded in the same manner as the mixture in Example 5 from a 6" wide slotted casting hopper maintained at a temperature of 180° C. The solvent-containing polyvinyl fluoride film was extruded from this hopper into a water bath maintained at about 10° C. at the approximate rate of 7 lbs./hr. The resulting tough, flat film, approximately 22 mils thick, showed none of the discoloration commonly associated with thermal degradation of the polymer.

Example 7

A 48% solids mixture of polyvinyl fluoride of inherent viscosity 2.2 and propylene carbonate was fed into a heated extruder connected to a 12" wide slotted steel casting hopper maintained at approximately 215° C., and from there continuously extruded into a water bath maintained at approximately 15° C. at the rate of about 20 lbs./hr. The resulting pliable, flat sheet was approximately 20 mils thick and showed no evidence of polymeric thermal degradation.

Example 8

A mixture comprising 6 parts of polyvinyl fluoride of inherent viscosity 4.6, 7 parts of propylene carbonate and 7 parts of ethylene carbonate was fed to a heated extruder connected to a 6" wide slotted steel casting hopper maintained at approximately 210° C. From there it was continuously extruded into a water bath maintained at about 8° C. at the rate of about 7 lbs./hr. The resulting film showed none of the yellowish or brownish discoloration characteristic of thermally degraded polymer. While restrained to prevent shrinkage, the sheet of polyvinyl fluoride was led through a zone of rapidly moving warm air to volatilize substantially all of the ethylene and propylene carbonate. A clear, pliable film approximately 6 mils thick resulted.

Example 9

A 37% solids mixture of polyvinyl fluoride of inherent viscosity 2.5 and N-acetylmorpholine was prepared. This mixture had a rather fluid consistency; it was extruded from a 6" wide slotted steel casting hopper maintained at about 215° C. in substantially the same manner as in Example 7 at the approximate rate of 5 lbs./hr. The issuing extrudate was conducted into a water bath maintained at approximately 13° C. The resulting 10 mil thick film, showing no evidence of thermally degraded polymer, was drawn off at the rate of approximately 3 feet/min.

Example 10

A 35% solids mixture of polyvinyl fluoride of inherent viscosity 2.2 and methyl salicylate was prepared. This mixture also had a rather fluid consistency. It was fed to a heated extruder connected to a 12" wide slotted steel casting hopper maintained at approximately 215°

C. and having an average lip setting of 30 mils. It was continuously extruded from this hopper into a water bath maintained at 15° C. at the rate of approximately 20 lbs./hr. Draw-off rate was adjusted to produce a film approximately 20 mils thick. This film was tough and pliable and showed no evidence of thermal degradation.

*Example 11*

A 50% solids mixture of polyvinyl fluoride of inherent viscosity 4.9 and cyclohexanone was prepared. This mixture had the consistency of a fluffy, damp powder. It was fed to a heated extruder connected to a 6" wide slotted steel casting hopper maintained at approximately 150° C. and with an average lip setting of approximately 25 mils. The issuing extrudate was quenched in a water bath maintained at about 8° C. After volatilizing the cyclohexanone in a current of warm air, the resulting pliable flat sheet was approximately 9 mils thick. Neither the yellowish nor brownish discolorations characteristic of thermally degraded polymer was evident.

*Example 12*

A rather fluid 30% solids mixture of polyvinyl fluoride of inherent viscosity 3.2 and dimethyl sulfolane was prepared. This mixture was fed to a heated extruder connected to a 12" wide slotted steel casting hopper from which it was extruded at a temperature in the vicinity of 215° C. at the approximate rate of 30 lbs./hr. The issuing extrudate was quenched in a water bath maintained at approximately 15° C. The resulting solvent-containing 20 mil thick polyvinyl fluoride film was flat and pliable and showed no evidence of polymeric thermal degradation.

*Example 13*

A 37% solids mixture of polyvinyl fluoride of inherent viscosity 3.0 and tetramethylene sulfone was prepared. The mixture had the consistency of a soft paste. This paste was fed continuously through a heated extruder connected to a 12" wide slotted steel casting hopper maintained at approximately 215° C. from which it was continuously extruded into a water bath maintained at about 8° C. at the rate of 15–20 lbs./hr. The resulting pliable, flat solvent-containing polyvinyl fluoride sheet was approximately 27 mils thick and showed no evidence of thermal degradation.

*Example 14*

A 20% solids mixture of polyvinyl fluoride of inherent viscosity 3.7 and gamma-butyrolactone was prepared. This rather fluid mixture was fed to an extruder connected to a 14" wide slotted steel casting hopper maintained at approximately 125–135° C. The continuously issuing extrudate was conducted into a calcium chloride brine maintained at approximately −15° C. at the rate of about 120 lbs./hr. The resulting solvent-containing, pliable, flat polyvinyl fluoride film was washed with a water spray as it emerged from the quench bath. Lack of either yellowish or brownish discoloration gave evidence that the extrusion had been accomplished without thermally degrading the polymer.

*Example 15*

A 40% solids mixture of polyvinyl fluoride of inherent viscosity 3.5 and gamma-butyrolactone was prepared. This mixture was fed to a heated extruder connected to a 14" wide slotted steel casting hopper maintained at approximately 145–155° C. from which it was continuously extruded at the rate of about 120 lbs./hr. into a 100% gamma-butyrolactone quench bath maintained at about 10° C. The resulting solvent-containing film was a tough, pliable, flat film and exhibited no evidence of polymeric thermal degradation. This same mixture was extruded at the same temperature into a quench bath comprising 50% water and 50% gamma-butyrolactone by weight, maintained at 10° C. A pliable, flat polyvinyl fluoride sheet approximately 25 mils thick and showing no evidence of having been thermally degraded was produced.

*Example 16*

A 45% solids mixture of polyvinyl fluoride of inherent viscosity 3.0 and gamma-butyrolactone was prepared. The mixture had the consistency of a soft paste. This paste was fed continuously through a heated extruder connected to a 14" wide slotted steel casting hopper having a lip opening of 48 mils and maintained at approximately 150–160° C., from which it was continuously extruded into a water bath maintained at about 8° C. at the rate of 75 lbs./hr. Draw-off rate was adjusted to produce a pliable, flat, solvent-containing polyvinyl fluoride sheet approximately 30 mils thick.

The process of this invention makes possible, for the first time, the production of self-supporting polyvinyl fluoride film and like structures having a satisfactory property level from orientable polymer of relatively high molecular weight under conditions designed to eliminate the possibility of thermal degradation, employing standard types of commercial process equipment and at an economically acceptable throughput efficiency. The process of this invention results, in particular, in the production of a tough, flexible, solvent-containing, self-supporting polyvinyl fluoride film capable of being oriented in two mutually perpendicular directions by a variety of means with consequent upgrading in property level and utility.

A further advantage in process economics is derived from the operability of the process of this invention with a feed consisting entirely of recycled solvent-containing film.

I claim:

1. A process for the production of shaped structures of polyvinyl fluoride which comprises (1) heating a mixture comprising essentially from 85% to 10% by weight, based on the total weight of the mixture, of particles of an orientable polyvinyl fluoride having an inherent viscosity of at least 1, and from 15% to 90% of a latent solvent for polyvinyl fluoride, to an elevated temperature effective to completely coalesce said particles and convert said mixture into a fluid composition; (2) extruding said fluid composition to form a self-supporting shaped structure at an elevated temperature below the normal boiling point of said latent solvent; (3) immediately thereafter cooling said structure to a temperature below 100° C.; and (4) drying said structure to remove substantially all of the latent solvent therefrom.

2. A process for the production of shaped structures of polyvinyl fluoride which comprises (1) heating a mixture comprising essentially from 85% to 10% by weight, based on the total weight of the mixture, of particles of an orientable polyvinyl fluoride having an inherent viscosity of at least 1, and from 15% to 90% of a latent solvent for polyvinyl fluoride, to an elevated temperature effective to completely coalesce said particles and convert said mixture into a fluid composition; (2) extruding said fluid composition to form a self-supporting shaped structure at an elevated temperature below the normal boiling point of said latent solvent; (3) immediately thereafter passing said structure into a liquid quench bath maintained at a temperature effective to cool said structure to a temperature below 100° C.; and (4) drying said structure to remove substantially all of the latent solvent therefrom.

3. The process of claim 2 wherein the quench bath in an aqueous quench bath.

4. The process of claim 3 wherein the quench bath is water.

5. The process of claim 2 wherein the quench bath is a latent solvent for polyvinyl fluoride.

6. A process for the production of polyvinyl fluoride film which comprises (1) heating a mixture comprising essentially from 85% to 10% by weight, based on the total weight of the mixture, of particles of an orientable polyvinyl fluoride having an inherent viscosity of at least 1, and from 15% to 90% of a latent solvent for polyvinyl fluoride, to an elevated temperature effective to completely coalesce said particles and convert said mixture into a fluid composition; (2) extruding said fluid composition in the form of a self-supporting film at an elevated temperature below the normal boiling point of said latent solvent; (3) immediately thereafter cooling said film to a temperature below 100° C.; and (4) drying said structure to remove substantially all of the latent solvent therefrom.

7. The process of claim 6 wherein the orientable polyvinyl fluoride has an inherent viscosity of from 3.5 to 4.0.

8. The process of claim 6 wherein the particles of orientable polyvinyl fluoride comprise from 40% to 60% by weight, based on the total weight of the mixture.

9. The process of claim 6 wherein said fluid composition is extruded in the form of a film at a temperature within the range of from 120° C. to 220° C., and below the normal boiling point of said latent solvent.

10. A process for the production of polyvinyl fluoride film which comprises (1) heating a mixture comprising essentially from 85% to 10% by weight, based on the total weight of the mixture, of particles of an orientable polyvinyl fluoride having an inherent viscosity of at least 1, and from 15% to 90% of a latent solvent for polyvinyl fluoride, to an elevated temperature effective to completely coalesce said particles and convert said mixture into a fluid composition; (2) extruding said fluid composition in the form of a self-supporting film at an elevated temperature below the normal boiling point of said latent solvent; (3) immediately thereafter passing said film into a liquid quench bath maintained at a temperature effective to cool said film to a temperature below 100° C.; and (4) drying said structure to remove substantially all of the latent solvent therefrom.

11. The process of claim 10 wherein the quench bath is an aqueous quench bath.

12. The process of claim 10 wherein the quench bath is water.

13. The process of claim 10 wherein the quench bath is a latent solvent for polyvinyl fluoride.

References Cited in the file of this patent

UNITED STATES PATENTS

| | | |
|---|---|---|
| Re. 20,080 | Robertson | Aug. 25, 1936 |
| 2,120,935 | Groff | June 14, 1938 |
| 2,148,062 | Esselen et al. | Feb. 21, 1939 |
| 2,245,708 | Patton | June 17, 1941 |
| 2,405,977 | Peters | Aug. 20, 1946 |
| 2,497,376 | Swallow et al. | Feb. 14, 1950 |
| 2,810,702 | Bechtold et al. | Oct. 22, 1957 |
| 2,855,631 | Rowley | Oct. 14, 1958 |